United States Patent [19]

Izumi et al.

[11] Patent Number: 5,390,156
[45] Date of Patent: Feb. 14, 1995

[54] MAGNETO-OPTIC OVERWRITE DISK RECORDING SYSTEM FOR ERASING AND OVERWRITING IN A SINGLE PASS

[75] Inventors: Haruhiko Izumi; Masaharu Moritsugu; Masakazu Taguchi, all of Kawasaki, Japan

[73] Assignee: Fujitsu Limited, Kawasaki, Japan

[21] Appl. No.: 130,848

[22] Filed: Oct. 4, 1993

[30] Foreign Application Priority Data

Oct. 9, 1992 [JP] Japan .................................. 4-271591

[51] Int. Cl.⁶ .............................................. G11B 11/00
[52] U.S. Cl. ........................................ 369/13; 369/124; 369/54; 360/59
[58] Field of Search .................. 369/13, 124, 54, 58, 369/110, 116, 44.38, 44.39, 44.14, 275.2, 275.1, 275.3, 32; 360/59, 114, 131, 66; 365/122

[56] References Cited

U.S. PATENT DOCUMENTS

5,170,382  12/1992  Yamada et al. .................. 369/13

Primary Examiner—Ali Neyzari
Attorney, Agent, or Firm—Armstrong, Westerman, Hattori, McLeland & Naughton

[57] ABSTRACT

A magneto-optic overwrite disk recording system capable of canceling shifts of the front edge and the rear edge of the record mark due to accumulation of heat. The recording system includes a magneto-optic overwrite disk having a memory magnetic film and a record magnetic film, a first magnet for applying an initialization magnetic field with a first strength vertically to the disk, and a second magnet for applying a bias magnetic field with a second strength smaller than the first magnetic field to the disk in the direction opposite to the initialization magnetic field. The recording system further includes a laser diode for generating laser beams, an optical head for focusing the laser beam on the disk, a pulse generator for generating square wave pulses with a predetermined period, and a duty ratio controller for alternately increasing and decreasing the duty ratio of the square wave pulses every time data "1" of binary record data is generated. The laser diode is driven by a constant-current circuit for write power. There is connected a switch between the laser diode and the constant-current circuit for write power. The switch is turned on/off in accordance with the output pulse of the duty ratio controller so that the laser diode emits a pulsed beam.

6 Claims, 13 Drawing Sheets

FIG. 2

PRIOR ART

MAGNETO-OPTIC OVERWRITE DISK RECORDING SYSTEM FOR ERASING AND OVERWRITING IN A SINGLE PASS

BACKGROUND OF THE INVENTION

1. Field of the Invention

The present invention relates to a magneto-optic overwrite disk recording system for recording data by overwrite, i.e., by writing new data over old data.

2. Description of the Related Art

Magneto-optic disks are receiving great attention as memory device playing an important role in the field of rapidly progressing multimedia equipment and there are strong demands for development of magneto-optic overwrite disks capable of transferring data at higher speeds. An ordinary magneto-optic disk has only one layer of magnetic film. Hence, when data is to be written in the disk, it is required to initialize the disk by aligning the magnetization of the magnetic film in one direction before writing data. To read one track of data with the magneto-optic disk of the described type, the disk is only required to be rotated one rotation. However, when writing data, since the initialization is necessary, the disk must be rotated at least two rotations, and because of this, the data transfer speed has been slow.

As one of the measures to achieve high-speed data transfer, it is urgently demanded to develop a magneto-optic disk recording system using a magneto-optic overwrite medium capable of writing data through rotation of the disk only one rotation.

Figure 1:
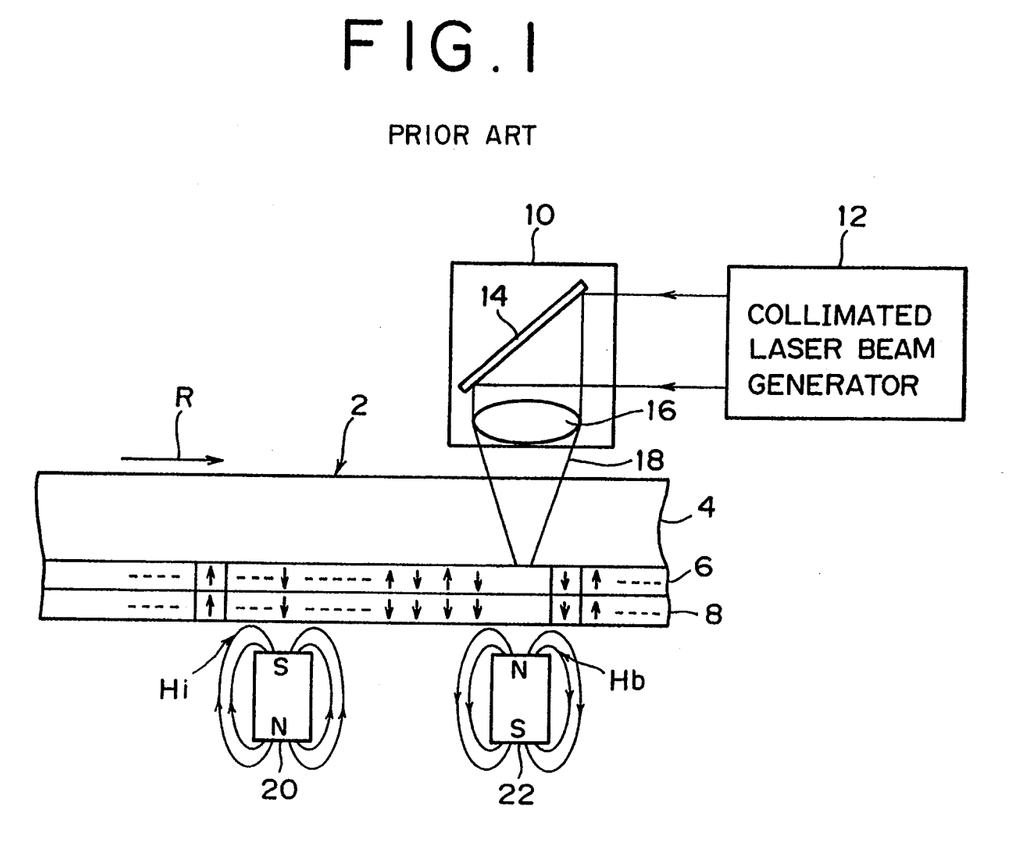
FIG. 1 is a diagram explanatory of the recording of data in a magneto-optic overwrite disk.

Referring to FIG. 1, a case of recording data in a magneto-optic overwrite disk will be described. A magneto-optic overwrite disk 2 is constructed of a memory magnetic film 6 formed on a transparent substrate 4 and a record magnetic film 8 formed on the memory magnetic film 6. The memory magnetic film 6 and the record magnetic film 8 are vertically magnetized films having different temperature characteristics of coercive force and Curie points and they are laminated to each other to achieve exchange-coupling therebetween. A laser beam 18 generated by a collimated laser beam generator 12 is reflected by a mirror 14 of an optical head 10 and focused through an objective lens 16 on the memory magnetic film 6 of the magneto-optic overwrite disk 2. On the side of the disk 2 opposite to the side irradiated by the laser beam, there is disposed a biasing magnet 22 applying a bias magnetic field Hb perpendicularly to the magnetic films 6 and 8, and on the upstream side of the biasing magnet 22, there is disposed an initializing magnet 20 applying an initialization magnetic field Hi to the magnetic films 6 and 8 in the opposite direction to the magnetic field of the biasing magnet 22.

Figure 2:
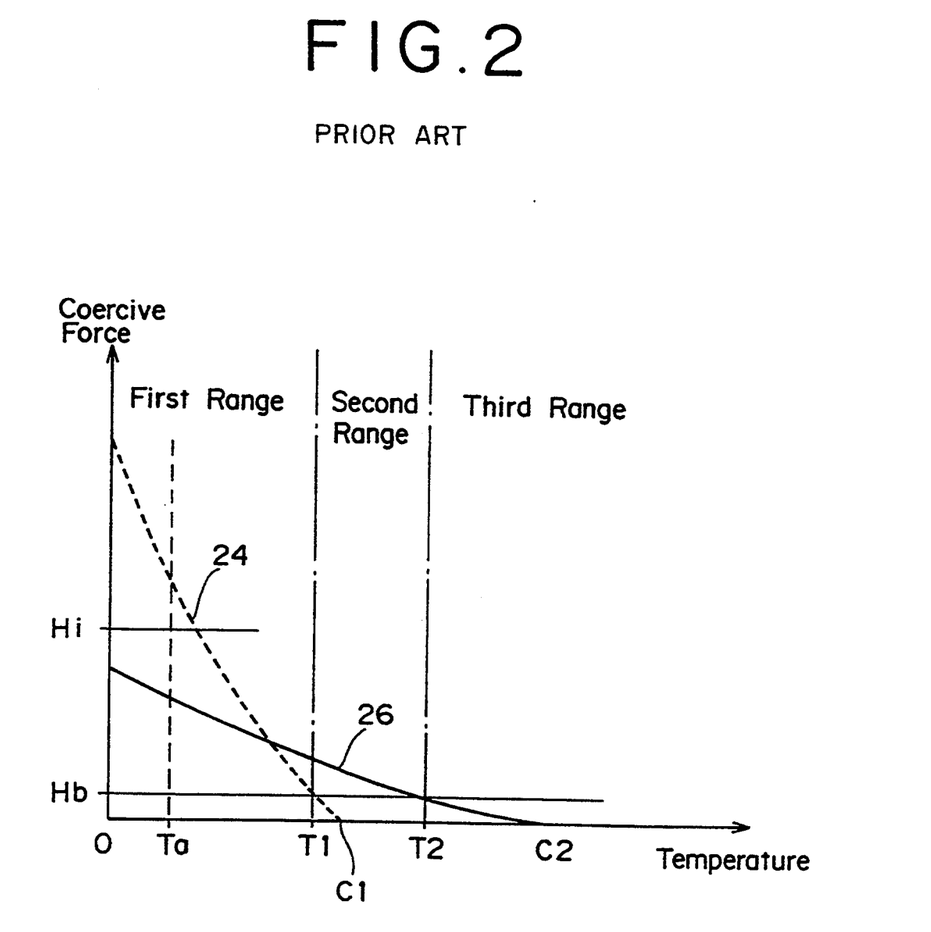
FIG. 2 is a diagram showing temperature characteristics of coercive forces of a memory magnetic film and a record magnetic film of a magneto-optic overwrite disk.

The overwrite of data is achieved by utilizing the difference in the temperature characteristics of the coercive force between the exchange-coupled memory magnetic film 6 and the record magnetic film 8. FIG. 2 is a diagram showing the temperature characteristics of the coercive force of the memory magnetic film 6 and the record magnetic film 8. The broken line 24 shows the coercive force of the memory magnetic film 6 and the solid line 26 shows the coercive force of the record magnetic film 8. As apparent from the diagram, both the memory magnetic film 6 and the record magnetic film 8 have their coercive forces decreasing with increase in the temperature. At the room temperature Ta, the coercive force of the memory magnetic film 6 is greater than the strength of the initialization magnetic field Hi and the coercive force of the record magnetic film 8 is smaller than the strength of the initialization magnetic field Hi.

The coercive force of the memory magnetic film 6 is smaller than the strength of the bias magnetic field Hb at the temperature higher than the first elevated temperature T1, while the coercive force of the record magnetic film 8 is smaller than the bias magnetic field Hb at the temperature higher than the second elevated temperature T2. The temperature range below the first elevated temperature T1 is defined as a first range, the temperature range above the first elevated temperature T1 and below the second elevated temperature T2 is defined as a second range, and the range above the second elevated temperature T2 is defined as a third range. The coercive force of the memory magnetic film 6 and the coercive force of the record magnetic film 8 intersect each other in the first range. The memory magnetic film 6 has its Curie point C1 in the second range, while the record magnetic film 8 has its Curie point C2 in the third range.

In the case where an ordinary magneto-optic disk with one layer of magnetic film is used, a laser beam with high power has been used for irradiating the disk surface in the recording of data and a laser beam with low power has been used for irradiating the disk surface in the reproduction of data. However, in the case where a conventional magneto-optic overwrite disk is used, two kinds of laser beams, i.e., that with high power and that with low power, have been used for irradiating the disk surface in the recording of data and a laser beam with lower power than the low power used in the recording of data has been used for irradiating the disk surface in the reproduction of data. The beam power used in the reproduction of data will hereinafter be called "read power".

Namely, in a conventional magneto-optic overwrite disk unit, laser beams with two levels of power, i.e., high power $P_H$ and low power $P_L$, have been used in the recording of data and a laser beam with read power $P_R$ has been used in the reproduction of data. When the laser beam with the read power $P_R$ is used, the temperature of the irradiated magnetic films 6 and 8 can be kept within the first range, i.e., below the point at which the coercive force of the memory magnetic film 6 indicated by the broken line 24 in FIG. 2 coincides with the strength of the bias magnetic field Hb.

When the laser beam with the low power $P_L$ is used for irradiation, the temperature of the magnetic films 6 and 8 can be elevated to the point, at which the coercive force of the memory magnetic film 6 is below the strength of the bias magnetic field Hb but the coercive force of the record magnetic film 8 indicated by the solid line 26 is not below the bias magnetic field Hb, in the second range (low temperature course). When the laser beam with the high power $P_H$ is used, the temperature of the magnetic films 6 and 8 can be elevated to the temperature in the third range (hightemperature course) at which the coercive force of the record magnetic film 8 is below the strength of the bias magnetic field Hb.

Operations at the time of the overwrite of data will be described below. When a disk 2 is rotated so that the portion to be recorded of the track assumes the position confronted by the initializing magnet 20, only the record magnetic film 8 is initialized by the initialization magnetic field Hi. This is because, as shown in FIG. 2, the strength of the initialization magnetic field Hi at the temperature around the room temperature Ta is set to be weaker than the coercive force of the memory magnetic film 6 and stronger than the coercive force of the record magnetic film 8. Hence, around the room temperature Ta, only the record magnetic film 8 is magnetized in the direction aligned with the initialization magnetic field Hi.

Figure 3A:
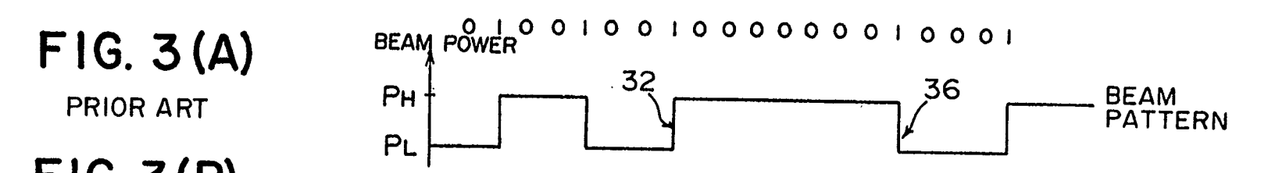
FIGS. 3(A)–3(D) are diagrams explanatory of recording/reproduction of marks in a conventional system.

When the disk 2 is further rotated and the initialized portion is brought to the position corresponding to the biasing magnet 22, the recording of data is performed in this position. When the data to be recorded is binary data as shown in FIG. 3(A), the laser diode within the collimated laser beam generator 12 is driven so that the laser beam assumes the pattern of low power $P_L$ and high power $P_H$ as shown in FIG. 3(B) according to the binary data.

When the laser beam is with the low power $P_L$, the temperature of the magnetic films 6 and 8 becomes that in the second range shown in FIG. 2 and the coercive force of the memory magnetic film 6 becomes weaker than the bias magnetic field Hb. At this time, the coercive force of the record magnetic film 8 is still stronger than the bias magnetic field Hb, and therefore, when the memory magnetic film 6 comes to be magnetized in the following course in which the disk 2 is further rotated and the irradiated portion is cooled down, the direction of magnetization of the memory magnetic film 6 is aligned with the direction of magnetization of the record magnetic film 8 by action of the exchange-coupling (exchange-interaction). That is, when the magnetic films 6 and 8 are heated up to the temperature in the second range, the direction of magnetization of the memory magnetic film 6 is aligned with the direction of the initialization magnetic field Hi.

On the other hand, when the laser beam is with the high power $P_H$, the magnetic films 6 and 8 are heated up to the temperature in the third range, in which the coercive forces of the memory magnetic film 6 and the record magnetic film 8 both become weaker than the bias magnetic field Hb. Therefore, the direction of magnetization of the record magnetic film 8 is aligned with the direction of the bias magnetic field Hb, which is opposite to the direction of magnetization in the initialization. In the following temperature falling course, the direction of magnetization of the memory magnetic film 6 is aligned with the direction of magnetization of the record magnetic film 8 by the exchange-interaction. More specifically, when the magnetic films 6 and 8 are heated up to the temperature in the third range, the directions of magnetization of both the memory magnetic film 6 and the record magnetic film 8 are aligned with the direction of the bias magnetic field Hb which is opposite to the direction of the initialization magnetic field Hi.

Figures 3B, 3C:
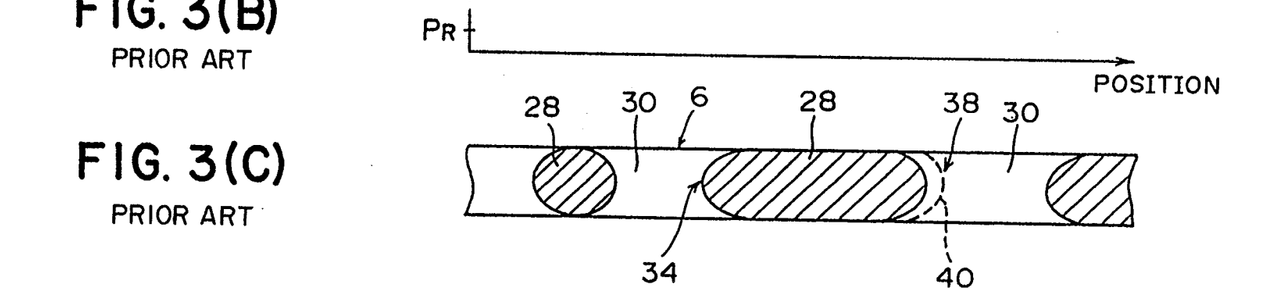
Figure 3D:
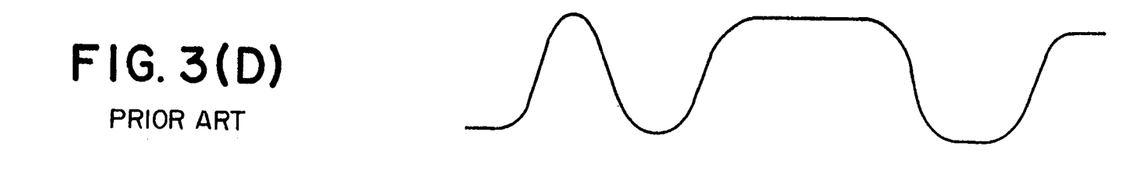

Accordingly, when the magnetic films 6 and 8 are heated up to a temperature in the third range, record marks (magnetic domains) 28 are formed in the memory magnetic film 6 as shown in FIG. 3(C) and, when the magnetic films 6 and 8 are heated up to a temperature in the second range, formerly recorded marks in the memory magnetic film 6 are erased as indicated by reference numeral 30 in FIG. 3(C). In this way, the overwrite of data can be achieved. In the reproduction of data, a laser beam with the read power $P_R$ is thrown on the disk 2 and a reproduced signal corresponding to the direction of magnetization as shown in FIG. 3(D) can be obtained by utilizing the magnetic Kerr effect.

However, when the mark 28 is recorded with the laser beam with the high power $P_H$ and low power $P_L$, if the front edge 34 of the record mark 28 corresponding to the leading edge 32 of the high level and the rear edge 38 of the record mark 28 corresponding to the trailing edge 36 of the high level shown in FIG. 3(B) and FIG. 3(C) are checked, the rear edge is shifted as indicated by the broken line 40 as a result of more greatly accumulated heat toward the rear of the record mark 28 because the disk 2 is heated by the laser beam while it is rotated. The longer the record mark 28 is, the greater becomes the accumulated heat at the rear edge side, and hence the larger becomes the shift of the rear edge. As a result, a proper mark 28 becomes unable to be recorded.

Figures 4A, 4B:
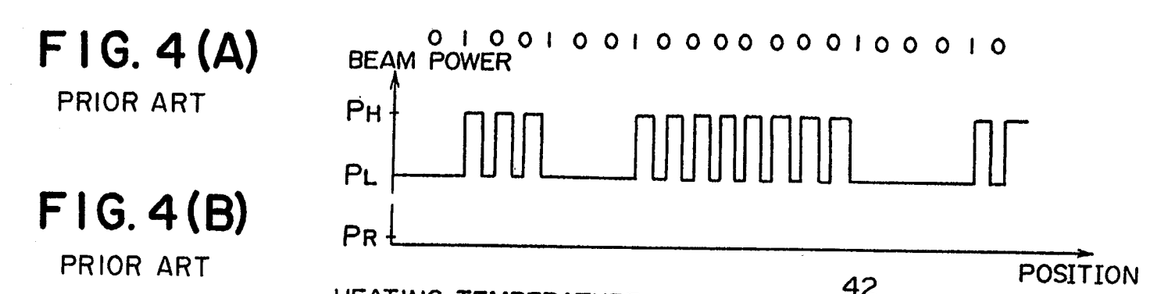
FIGS. 4(A)–4(D) are diagrams explanatory of recording/reproduction of marks in another conventional system.

There is proposed a method to reduce the shift of the rear edge. This method is such as causes the laser beam in the formation of a mark to be emitted as pulsed beam as shown in FIG. 4(B). If the laser beam is emitted as a pulsed beam, the heat energy supplied to the magnetic films 6 and 8 can be suppressed as compared with the case where the laser beam is emitted continuously.

Figure 4C:
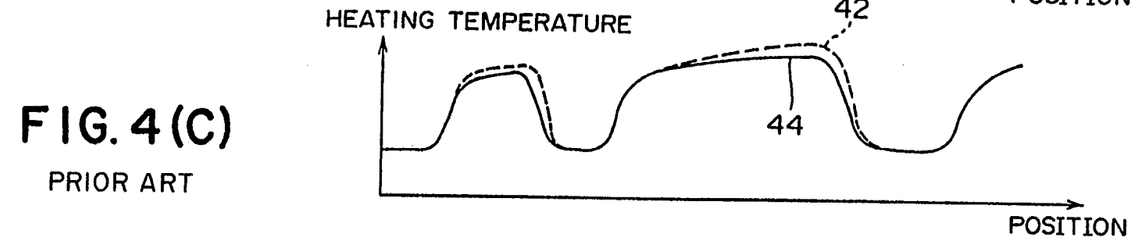
Figure 4D:
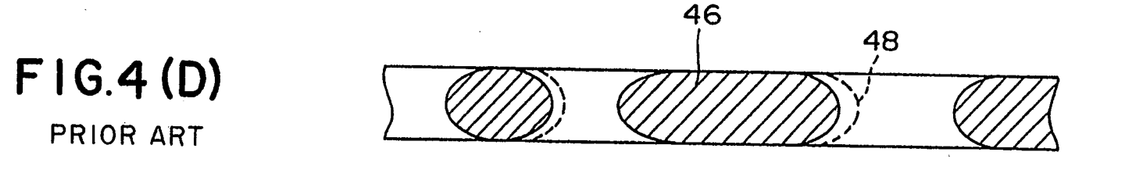

More specifically, when a laser beam with the waveform as shown in FIG. 3(B) is thrown on the disk 2, the heated temperature of the magnetic films 6 and 8 becomes as indicated by the broken line 42 in FIG. 4(C), but when a laser beam with the waveform as shown in FIG. 4(B) is thrown, the heated temperature of the magnetic films 6 and 8 becomes as indicated by the solid line 44 in FIG. 4(C). As a result, the shift of the rear edge of the record mark 46 indicated by the broken line 48 in FIG. 4(D) can be canceled.

Figure 5:
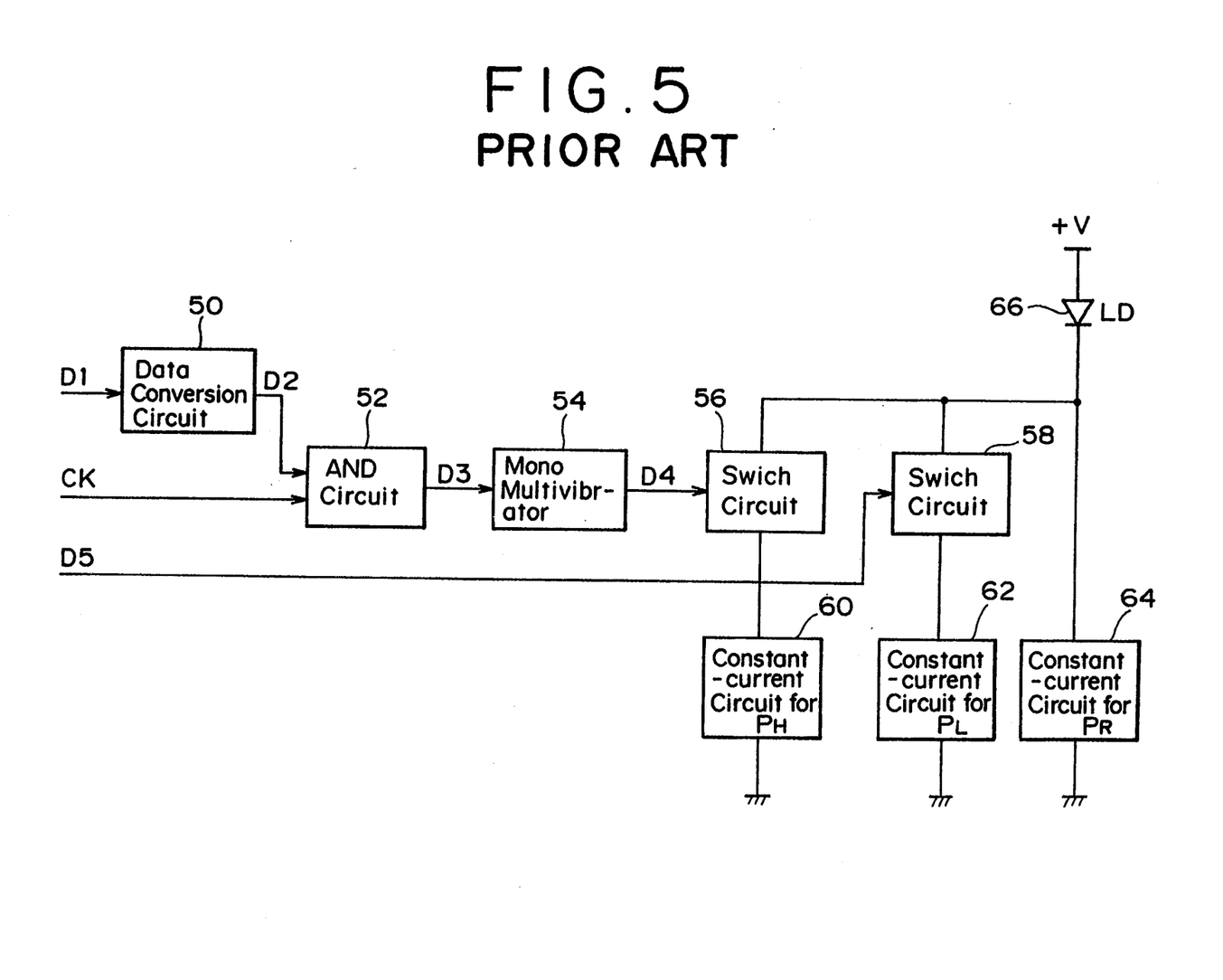
FIG. 5 is a block diagram of a conventional magneto-optic overwrite disk recording system.

A conventional magneto-optic overwrite disk recording system for recording data with a pulsed laser beam will be described below with reference to FIG. 5. The recording system is structured of a data conversion circuit 50, an AND circuit 52, a mono multivibrator 54, switch circuits 56 and 58, a constant-current circuit for high power 60, a constant-current circuit for low power 62, a constant-current circuit for read power 64, and a laser diode 66, which are connected as shown in FIG. 5.

Figures 6A, 6B, 6C:
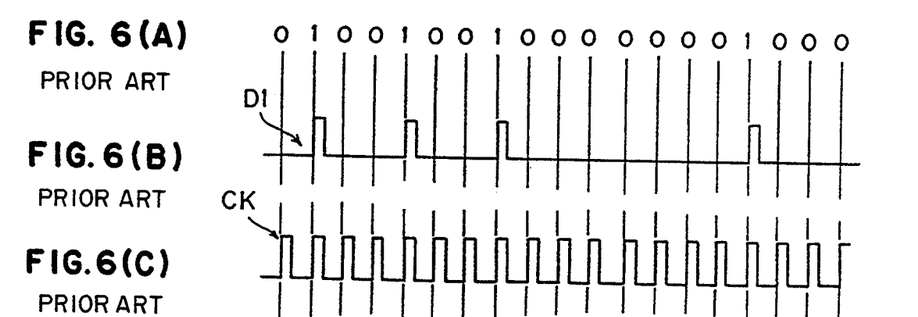
FIGS. 6(A)–6(F) are signal waveform charts explanatory of operations of the recording system shown in FIG. 5.
Figure 6D:
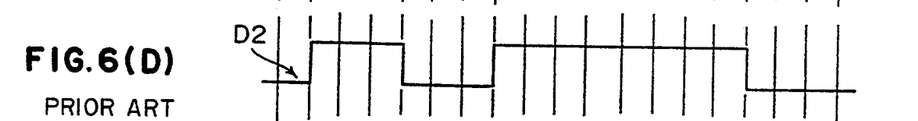
Figure 6E:
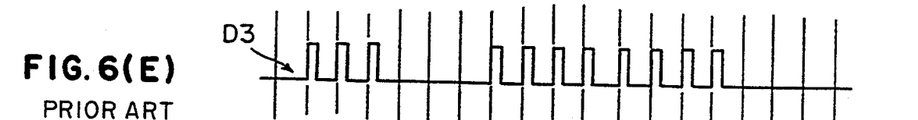

The data conversion circuit 50 converts record data D1 with the waveform as shown in FIG. 6(B) to data D2 with the waveform as shown in FIG. 6(D). The record data D1 is that obtained by converting the binary data shown in FIG. 6(A) to a waveform having high level and low level corresponding to "1" and "0" in the binary data and the record data D1 corresponds to the data shown in FIG. 4(A). The AND circuit 52 produces the logical product of the data D2 and the clock signal CK and outputs the logical product as data D3, which has a waveform as shown in FIG. 6(E).

Figure 6F:
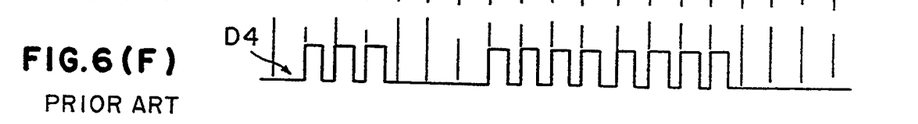

The mono multivibrator 54 is that outputting a pulse of a predetermined duty ratio (a pulse with a predetermined pulse width) upon receipt of a piece of high level data. When each pulse of the data D3 is supplied thereto, it, slightly increasing the duty ratio of the data D3, outputs a pulse as shown in data D4 of FIG. 6(F). The switch circuit 56 is turned on when each high level of the data D4 is supplied thereto, while the switch circuit 58 is turned on when each high level of erase data D5 is supplied thereto.

The laser diode 66 selectively outputs laser beams with the read power $P_R$, the low power $P_L$, and the high power $P_H$. When the switch circuits 56 and 58 are both turned off, a constant current controlled by the constant-current circuit for read power 64 is supplied to the laser diode 66 and, hence, the laser diode 66 outputs a laser beam with the read power $P_R$. Thereby, the marks recorded in the memory magnetic film 6 are read. When the erase data D5 at high level is supplied to the switch circuit 58 and thereby the switch circuit 58 is turned on, a constant current controlled by the constant-current circuit for low power 62 and the constant-current circuit for read power 64 is supplied to the laser diode 66 and, hence, the laser diode 66 outputs a laser beam with the low power $P_L$. Thereby, the recorded mark in the memory magnetic film 6 is erased.

On the other hand, if the high level of the data D4 is supplied to the switch circuit 56 and thereby the switch circuit 56 is turned on, while the erase data D5 is at high level, a constant current controlled by the constant-current circuit for high power 60, the constant-current circuit for low power 62, and the constant-current circuit for read power 64 is supplied to the laser diode 66, so that the laser diode 66 outputs a laser beam with the high power $P_H$. Thus, a mark is recorded in the memory magnetic film 6.

With the above described conventional recording system, the shift of the rear edge of the record mark can be canceled. However, there is a problem in this recording system that the front edge of the mark shifts forward making it impossible to record a proper mark. This trouble is produced, when the distance between a record mark and the following record mark is small, by the heat accumulated in the former record mark affecting the front edge portion of the latter record mark thereby causing the front edge of the latter record mark to shift forward.

Further, in the conventional recording system, the recording of data is performed by heating the magnetic films 6 and 8 with laser beams having the high power $P_H$ and the low power $P_L$ up to a temperature in the second range and a temperature in the third range shown in FIG. 2, respectively, and therefore two systems of circuits, i.e., the constant-current circuit for high power 60 and the constant-current circuit for low power 62, are required to drive the laser diode 66 in the data recording. Since the constant-current circuit occupies a large portion of the overall circuit scale of the recording system, there arises a problem that the circuit configuration of the entire system becomes complex and large in scale.

SUMMARY OF THE INVENTION

Accordingly an object of the present invention is to provide a magneto-optic overwrite disk recording system capable of canceling shifts of the front edge and rear edge of the mark when recording data by forming marks in a magneto-optic overwrite disk.

Another object of the present invention is to provide a magneto-optic overwrite disk recording system which is simple in circuit configuration and small in scale.

In accordance with an aspect of the present invention, there is provided a magneto-optic overwrite disk recording system comprising: a magneto-optic overwrite disk including a transparent substrate, a memory magnetic film formed on the transparent substrate, and a record magnetic film formed on the memory magnetic film; first magnetic field generation means for applying an initialization magnetic field with a first strength to the disk in the vertical direction thereto; second magnetic field generation means for applying a bias magnetic field with a second strength smaller than the first strength to the disk in the direction opposite to the initialization magnetic field, wherein the memory magnetic film has its coercive force larger than the strength of the initialization magnetic field at the room temperature and smaller than the strength of the bias magnetic field at a temperature above a first elevated temperature, the record magnetic film has its coercive force being of the strength between the strength of the initialization magnetic field and the strength of the bias magnetic field at the room temperature, smaller than the coercive force at the room temperature and larger than the strength of the bias magnetic field at a temperature above the first elevated temperature, and smaller than the strength of the bias magnetic field at a temperature above a second elevated temperature higher than the first elevated temperature, the memory magnetic film has its Curie point between the first elevated temperature and the second elevated temperature, and the record magnetic film has its Curie point higher than the second elevated temperature; light beam generation means for generating a light beam; an optical head focusing the light beam on the disk; pulse generation means for generating square wave pulses with a predetermined period; duty ratio control means operatively connected with the pulse generation means for alternately increasing and decreasing the duty ratio of the square wave pulses every time data "1" of binary record data is generated; a first switch operatively connected with the duty ratio control means and the light beam generation means being turned on/off in accordance with the square wave pulse output from the duty ratio control means; and first drive means operatively connected with the first switch for driving the light beam generation means with a first driving current when the first switch is on, wherein it is adapted such that the light beam generation means, when a pulse with an increased duty ratio is applied to the first switch, is driven by the first drive means to generate a first light beam pulse, which first light beam pulse heats the memory magnetic film and the record magnetic film up to a temperature above the second elevated temperature and causes a mark having its direction of magnetization opposite to the direction of the initialization magnetic field to be formed in the magnetic films, and when a pulse with a decreased duty ratio is applied to the first switch, is driven by the first drive means to generate a second light beam pulse, which second light beam pulse heats the memory magnetic film and the record magnetic film up to a temperature above the first elevated temperature and below the second elevated temperature and causes a formerly formed mark in the memory magnetic film to be erased.

Preferably, the pulse generation means generates square wave pulses at a frequency over the maximum repetition frequency of the record data. The magneto-optic overwrite disk recording system further comprises second drive means operatively connected with the light beam generation means for driving the light beam generation means with a second driving current smaller than the first driving current. The second drive means drives the light beam generation means so as to generate a light beam with a reproducing optical power when the first switch is off.

According to the present invention, when the recording of data is performed by forming marks in a magneto-optic overwrite disk, it is achieved to record proper marks in which shifts of the front edge and rear edge of the mark are canceled. Further, since it is adapted such that light beam generation means can be driven only by one drive means when the recording and erasing of data are performed, the circuit scale of the entire system can be made smaller than that of conventional structure.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 12(A)–12(K) are signal waveform charts explanatory of operations in the recording system of the second embodiment.

DESCRIPTION OF THE PREFERRED EMBODIMENTS

First, a magneto-optic overwrite disk recording system according to a first embodiment of the present invention will be described with reference to FIG. 7. In the description of the first embodiment, the component parts substantially the same as those in the conventional recording system shown in FIG. 5 will be denoted by like reference numerals.

Figure 7:
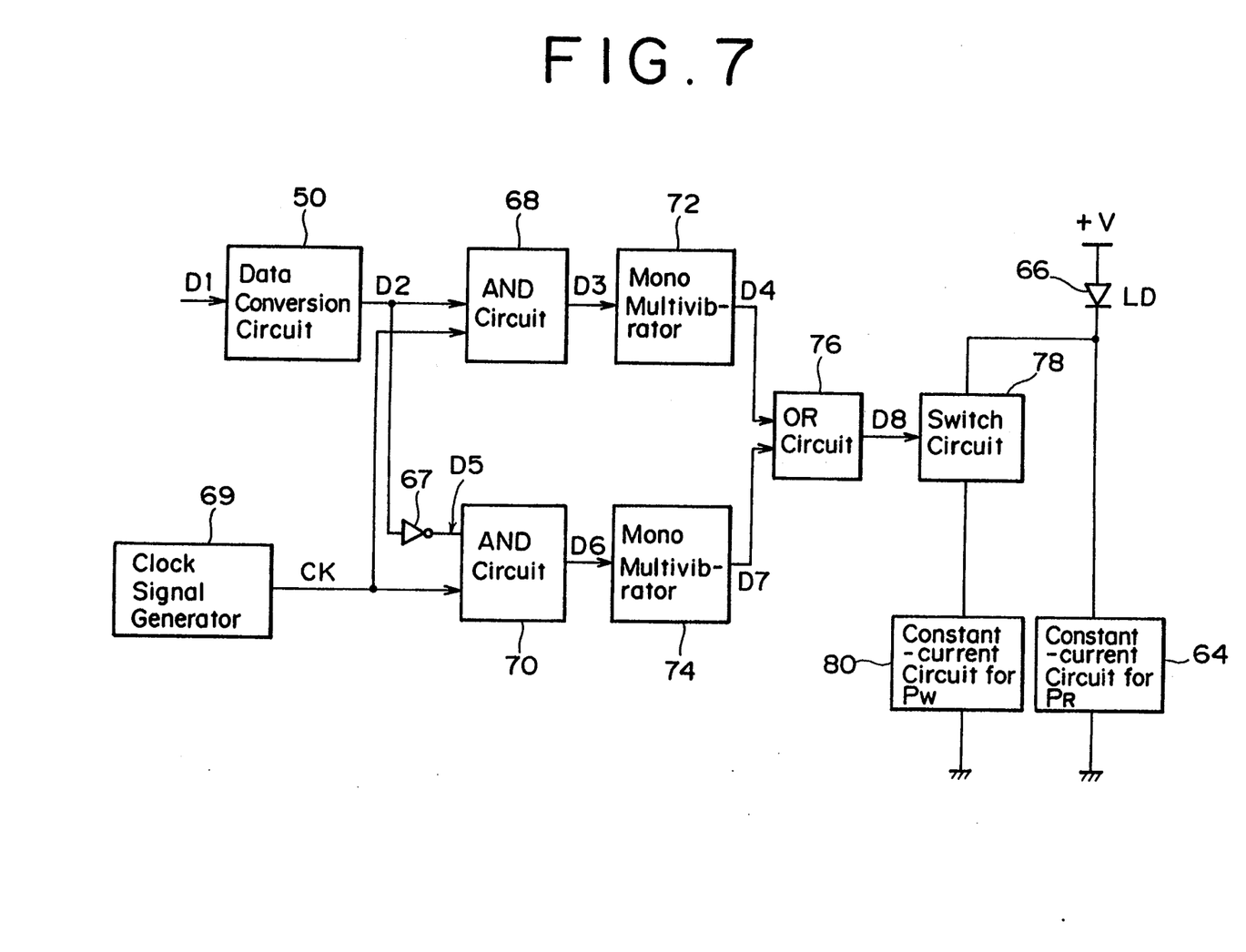
FIG. 7 is a block diagram of a magneto-optic overwrite disk recording system according to a first embodiment of the present invention.

The recording system of the present embodiment is structured of a data conversion circuit 50, an inverter 67, a clock signal generator 69, AND circuits 68 and 70, mono multivibrators 72 and 74, an OR circuit 76, a switch circuit 78, a constant-current circuit for write power 80, a constant-current circuit for read power 64, and a laser diode 66, which are connected as shown in FIG. 7.

Figure 8A:
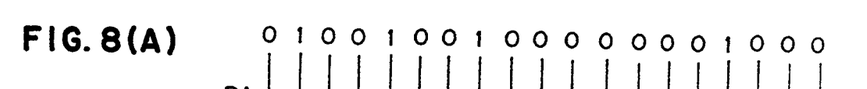
FIGS. 8(A)–8(J) are signal waveform charts explanatory of operations in the recording system of the first embodiment.
Figure 8B:
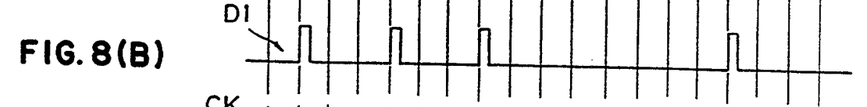
Figure 8C:
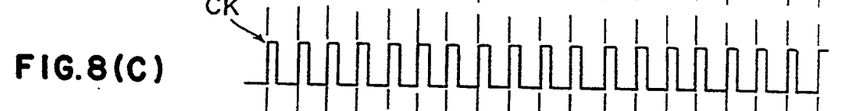
Figure 8D:
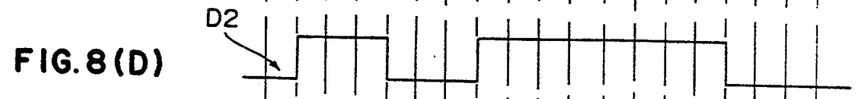
Figure 8E:
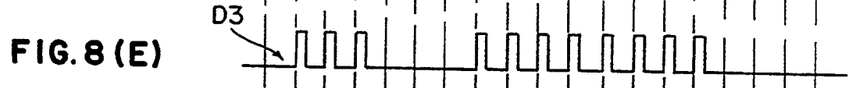
Figure 8F:
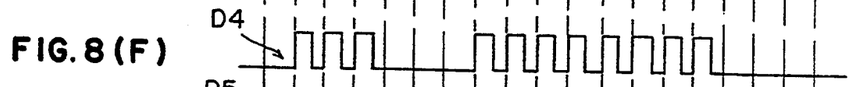
Figure 9A:
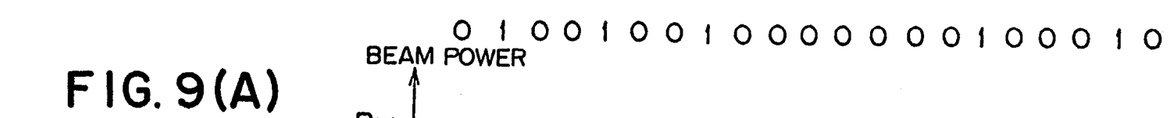
FIGS. 9(A)–9(D) are diagrams explanatory of recording/reproduction of marks with laser beams obtained in the recording system of the first embodiment.

Record data D1 with the waveform shown in FIG. 8(B) is converted by the data conversion circuit 50 to data D2 with the waveform shown in FIG. 8(D). The record data D1 is such as is obtained by converting the binary data shown in FIG. 8(A) to a waveform having high level and low level corresponding to "1" and "0" in the binary data and the record data D1 corresponds to the data shown in FIG. 9(A). The logical product of the data D2 and the clock signal CK from the clock signal generator 69 is obtained by the AND circuit 68 and data D3 with the waveform as shown in FIG. 8(E) is output from the AND circuit 68 and supplied to the mono multivibrator 72. The mono multivibrator 72 is that outputting a pulse of a predetermined duty ratio (a pulse with a predetermined pulse width) upon receipt of a piece of high level data, and when each pulse of the data D3 is supplied thereto, it outputs a pulse as shown in data D4 of FIG. 8(F) by slightly increasing the duty ratio of the data D3.

Figures 8G, 8H:
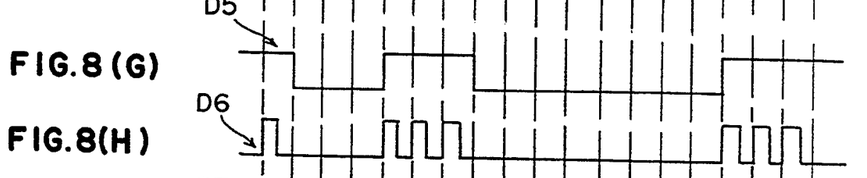
Figure 8I:
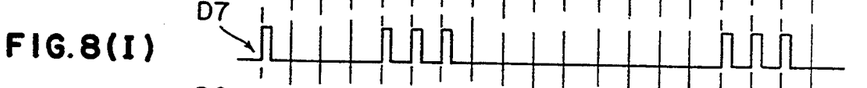

On the other hand, the data D2 output from the data conversion circuit 50 is inverted by the inverter 67 before being input to the AND circuit 70. The inverted output from the inverter 67, data D5, is shown in FIG. 8(G). In the AND circuit 70, the logical product of the data D5 and the clock signal CK is obtained and the logical product is supplied as data D6 to the mono multivibrator 74. The mono multivibrator 74, when each pulse of the data D6 is supplied thereto, outputs a pulse as shown in data D7 of FIG. 8(I) by slightly decreasing the duty ratio of the data D6. In the OR circuit 76, the logical sum of the data D4 and the data D7 is obtained and the result is output therefrom as data D8 as shown in FIG. 8(J) to be supplied to the switch circuit 78.

The switch circuit 78 is turned on when it is supplied with a high level of the data D8 and turned off when it is supplied with a low level. The laser diode 66 is supplied with a constant current controlled by the constant-current circuit for read power 64 when the switch circuit 78 is turned off and outputs a laser beam with the read power $P_R$, while the same is supplied with a constant current controlled by the constant-current circuit for read power 64 and the constant-current circuit for write power 80 when the switch circuit 78 is turned on and outputs a laser beam with the write power $P_W$.

Figure 8J:
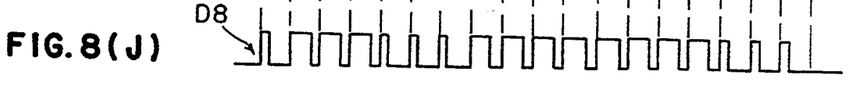
Figure 9B:
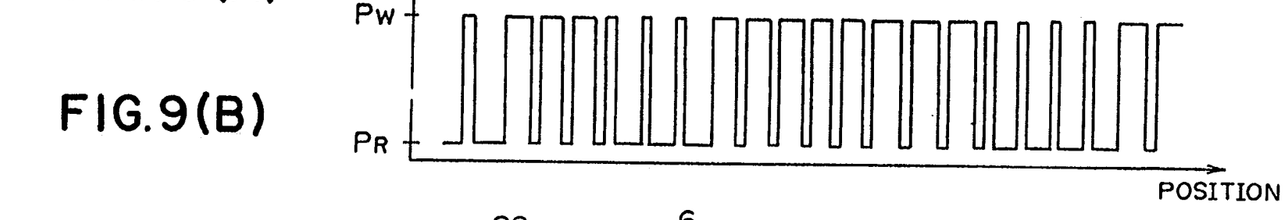

Since the switch circuit 78 is turned on/off in accordance with the data D8 with the waveform shown in FIG. 8(J), the power of the laser beam obtained from the laser diode 66 driven correspondently to the switching operations becomes series of pulses with large duty ratio and pulses with small duty ratio as shown in FIG. 9(B) corresponding to the waveform of the data D8 shown in FIG. 8(J). More specifically, the average power at a portion where pulses with large duty ratio are continuing becomes the high power $P_H$ and the average power at a portion where pulses with small duty ratio are continuing becomes the low power $P_L$.

Figure 9C:
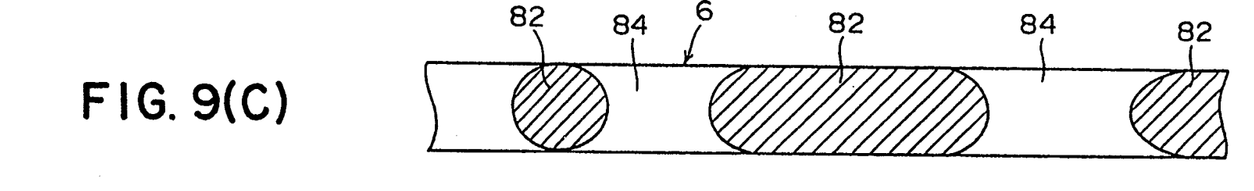

When a laser beam whose average power is the high power $P_H$ is thrown on the disk 2, the magnetic films 6 and 8 are heated up to a temperature in the third range shown in FIG. 3 and, therefore, a mark is recorded in the memory magnetic film 6 as indicated by reference numeral 82 in FIG. 9(C). On the other hand, when a laser beam whose average power is the low power $P_L$ is thrown on the disk 2, the magnetic films 6 and 8 are heated up to a temperature in the second range shown in FIG. 3 and, therefore, a formerly recorded mark in the memory magnetic film 6 is erased as indicated by reference numeral 84 in FIG. 9(C).

Figure 9D:
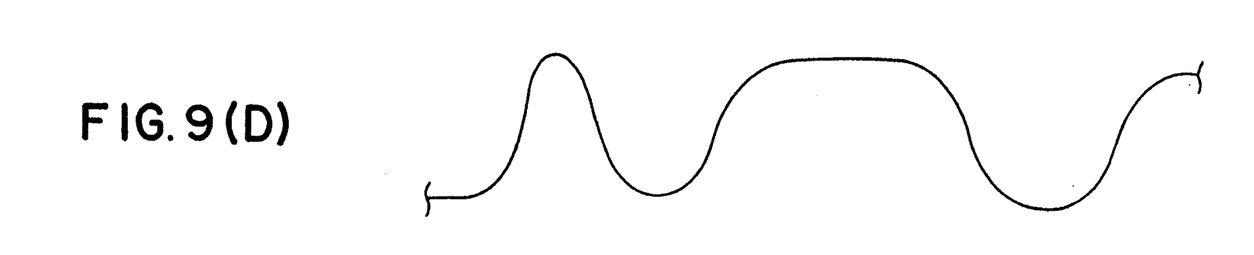

When it is desired to reproduce the recorded data, the switch circuit 78 is turned off. Thereby, the laser diode 66 is driven by the constant-current circuit for read power 64 and outputs a laser beam with the read power $P_R$. By focusing this laser beam through the objective lens 16 on the memory magnetic film 6, a reproduced signal with the waveform as shown in FIG. 9(D) can be obtained.

In the present embodiment, by causing the laser diode 66 to emit a pulsed beam, the heat energy applied to the magnetic films 6 and 8 in the recording of data can be suppressed and, therefore, the rearward shift of the rear edge of the mark 82 in the memory magnetic film 6 can be prevented from occurring. Further, since, in this embodiment, data recording by overwrite and erasing can be achieved by driving the laser diode 66 using only a single constant-current circuit for write power 80, the circuit configuration of the entire system can be made simpler and smaller than that in the system of conventional structure.

Figure 10:
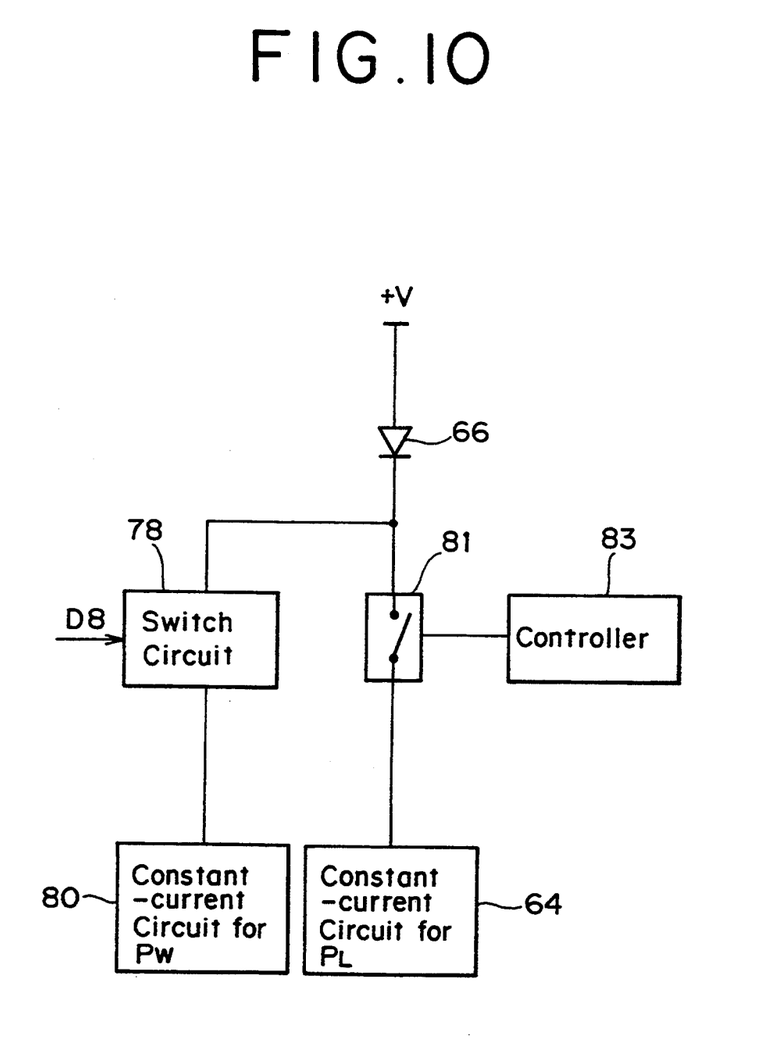
FIG. 10 is a block diagram of a portion of a variation circuit of the first embodiment.

As a variation of this embodiment, the laser diode 66 may be driven with the constant-current circuit for read power 64 turned off in the recording of data. To achieve this, a switch 81 may be connected between the laser diode 66 and the constant-current circuit for read power 64 as shown in FIG. 10 and, with this switch 81 turned off by a controller 83, the switch circuit 78 may be turned on/off in response to the data D8. Thereby, the beam emitting period of the laser diode 66 in the erasing of the recorded mark can be prolonged and, hence, the beam emitting operation of the laser diode 66 can be stabilized. In other words, the average power at the portion where pulses with small duty ratio continue can be stabilized and, therefore, the record mark can be erased properly.

Figure 11:
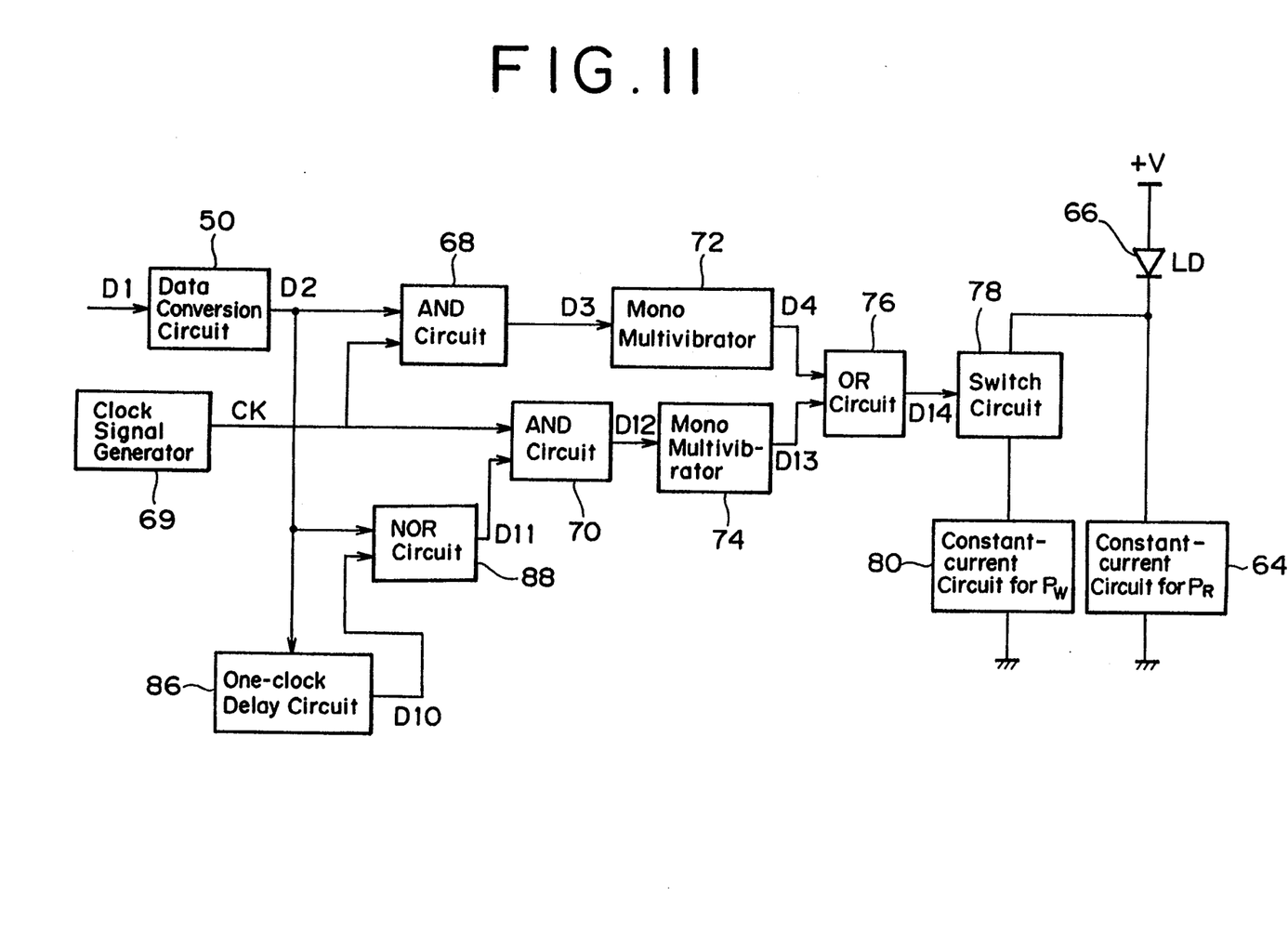
FIG. 11 is a block diagram of a magneto-optic overwrite disk recording system according to a second embodiment of the present invention.

Referring now to FIG. 11, a magneto-optic overwrite disk recording system according to a second embodiment of the invention will be described. In the description of the present embodiment, parts substantially the same as the parts in the first embodiment shown in FIG. 7 will be denoted by like reference numerals and explanation of them will be partly omitted to avoid duplication.

The recording system of the present embodiment eliminates the inverter 67 from the recording system shown in FIG. 7 and has one-clock delay circuit 86 and a NOR circuit 88 newly added thereto by being connected as shown in FIG. 11. The one-clock delay circuit 86 delays data D2 shown in FIG. 12(D) one clock and outputs it as data D10 as shown in FIG. 12(G). The NOR circuit 88 inverts the logical sum of the data D2 and the data D10 and outputs the data thus obtained as data D11 as shown in FIG. 12(H).

Figures 12A, 12K:
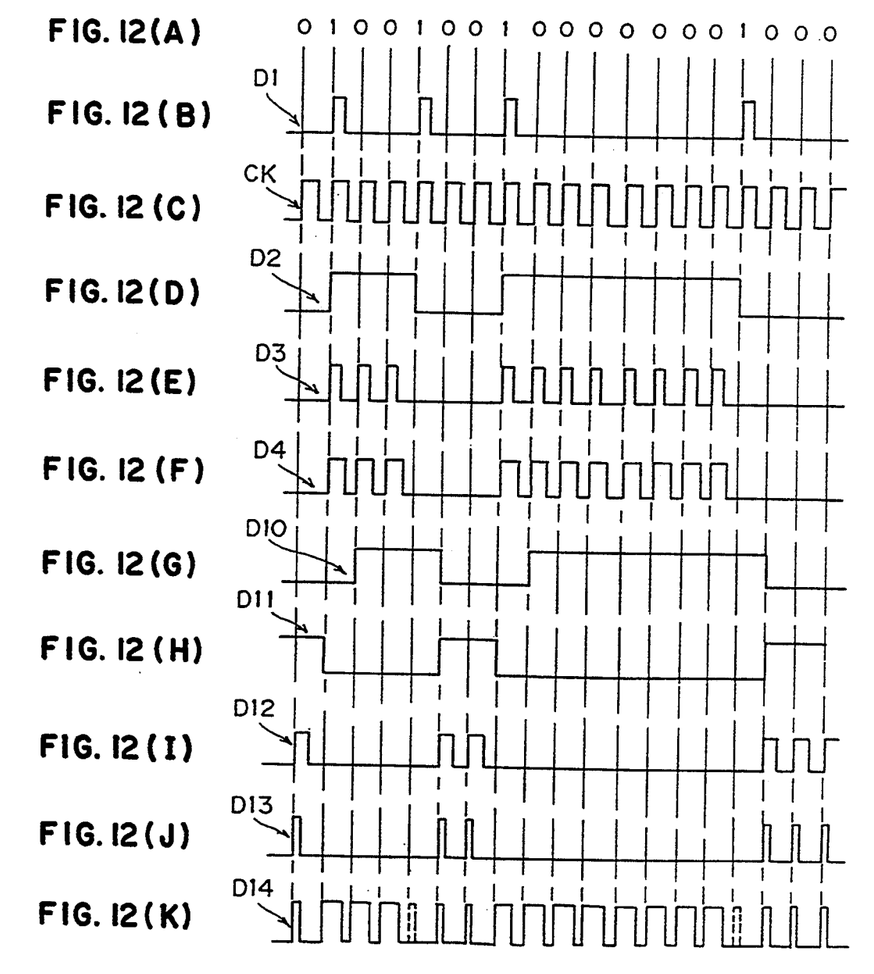

The data D11 output from the NOR circuit 88 and the clock signal CK are subjected to the logical product operation in the AND circuit 70 and data D12 obtained as the result as shown in FIG. 12(I) is supplied to the mono multivibrator 74. The mono multivibrator 74, upon receipt of each pulse of the data D12, outputs a pulse as shown in data D13 of FIG. 12(J) by slightly decreasing the duty ratio of the pulse of the data D12. Then, the logical sum of the data D4 and the data D13 is obtained in the OR circuit 76 and data D14 thus obtained as shown in FIG. 12(K) is supplied to the switch circuit 78.

Figures 13A, 13B:
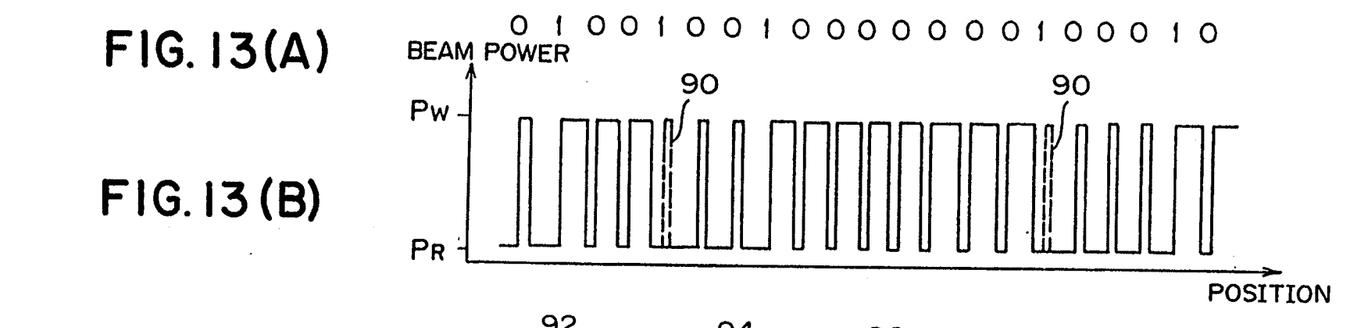
FIGS. 13(A)–13(D) are diagrams explanatory of recording/reproduction of marks with laser beams obtained in the recording system of the second embodiment.
Figure 13C:
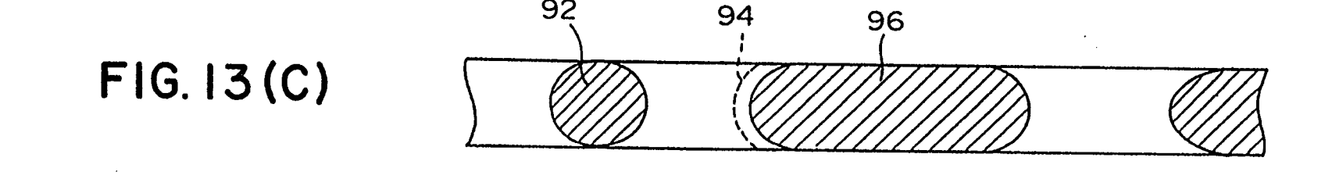
Figure 13D:
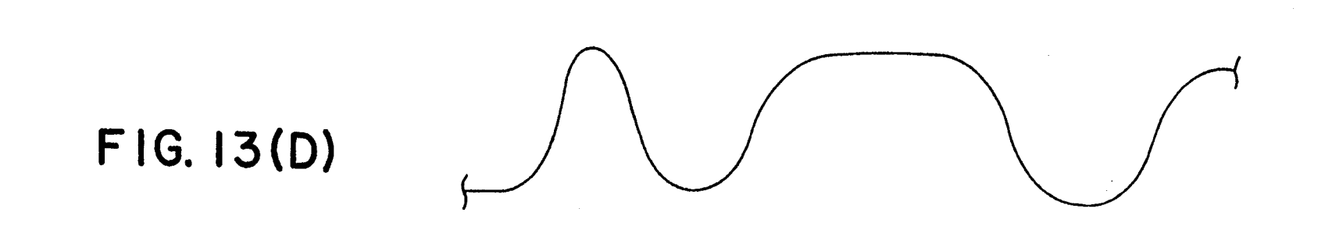

The data D14, as apparent from its comparison with the data D8 shown in FIG. 8(J), has the pulse indicated by the broken line in FIG. 12(K) eliminated. Accordingly, the laser beam obtained from the laser diode 66 emitting the beam in accordance with the switching operation of the switch circuit 78 which is turned on/- off responding to the data D14 becomes a pulsed beam with the power shown in FIG. 13(B). In this pulsed beam, the pulse indicated by the broken line 90 in FIG. 13(B) is eliminated.

Namely, one pulse, which immediately follows a pulsed beam for recording a mark, is eliminated from a series of pulsed beams for erasing a formerly recorded mark, and therefore, transmission of heat to the rear portion becomes correspondently difficult. As a result, the shift of the front edge of the mark 96 indicated by the broken line 94 to be produced by the transmission of the heat used for recording the immediately preceding mark 92 can be effectively prevented and, hence, a proper mark can be formed.

Since the laser diode 66 in this second embodiment is caused to emit pulsed beams, the shift of the rear edge of the mark can also be effectively prevented. While one pulse of the pulsed beam has been eliminated in the above described second embodiment, the number of eliminated pulses can suitably be determined according to the recording conditions, characteristics of the medium, and the like.

What is claimed is:

1. A magneto-optic overwrite disk recording system comprising:

a magneto-optic overwrite disk including a transparent substrate, a memory magnetic film formed on said transparent substrate, and a record magnetic film formed on said memory magnetic film;

first magnetic field generation means for applying an initialization magnetic field with a first strength to said disk in the vertical direction thereto;

second magnetic field generation means for applying a bias magnetic field with a second strength smaller than the first strength to said disk in the direction opposite to the initialization magnetic field;

said memory magnetic film having its coercive force larger than the strength of said initialization magnetic field at a room temperature and smaller than the strength of said bias magnetic field at a temperature above a first elevated temperature, said record magnetic film having its coercive force being of a strength between the strength of said initialization magnetic field and the strength of said bias magnetic field at the room temperature, smaller than a coercive force at the room temperature and larger than the strength of the bias magnetic field at a temperature above the first elevated temperature, and smaller than the strength of said bias magnetic field at a temperature above a second elevated temperature higher than the first elevated temperature, the memory magnetic film having its Curie point between the first elevated temperature and the second elevated temperature, and the record magnetic film having its Curie point higher than the second elevated temperature;

light beam generation means for generating a light beam;

an optical head focusing said light beam on said disk;

pulse generation means for generating square wave pulses with a predetermined period;

duty ratio control means operatively connected with said pulse generation means for alternately increasing and decreasing a duty ratio of the square wave pulses every time data "1" of binary record data is generated;

a first switch operatively connected with said duty ratio control means and said light beam generation means being turned on/off in accordance with the square wave pulses output from said duty ratio control means; and first drive means operatively connected with said first switch for driving said light beam generation means with a first driving current when said first switch is on, said light beam generation means, when a pulse with an increased duty ratio is applied to said first switch, being driven by said first drive means to generate a first light beam pulse, which first light beam pulse heats said memory magnetic film and said record magnetic film up to a temperature above the second elevated temperature and causes a mark having its direction of magnetization opposite to the direction of the initialization magnetic field to be formed in said magnetic films, and when a pulse with a decreased duty ratio is applied to said first switch, being driven by said first drive means to generate a second light beam pulse, which second light beam pulse heats said memory magnetic film and said record magnetic film up to a temperature above the first elevated temperature and below the second elevated temperature and causes a formerly formed mark in said memory magnetic film to be erased.

2. A magneto-optic overwrite disk recording system according to claim 1, wherein said pulse generation means generates square wave pulses at a frequency over a maximum repetition frequency of the record data.

3. A magneto-optic overwrite disk recording system according to claim 2, further comprising second drive means operatively connected with said light beam generation means for driving said light beam generation means with a second driving current smaller than the first driving current, said second drive means being adapted to drive said light beam generation means so as to generate a light beam with a reproducing optical power when said first switch is off.

4. A magneto-optic overwrite disk recording system according to claim 3, further comprising:

a second switch provided between said light beam generation means and said second drive means; and control means for turning said second switch off when data is to be recorded in said disk and turning said second switch on when data recorded in said disk is to be read.

5. A magneto-optic overwrite disk recording system according to claim 1, wherein said duty ratio control means comprises:

a data conversion circuit for converting a portion of the binary record data for which a mark is to be recorded to high level data and another portion thereof for which a formerly recorded mark is to be erased to low level data;

a first AND circuit operatively connected with said data conversion circuit and said pulse generation means for obtaining and outputting a logical product of an output data from said data conversion circuit and the square wave pulse from said pulse generation means;

a first mono multivibrator operatively connected with said first AND circuit for outputting, every time a high level of the output pulse data of said first AND circuit is supplied thereto, an output pulse data with its duty ratio increased;

an inverter operatively connected with said data conversion circuit for inverting the output data from said data conversion circuit and outputting an inverted data;

a second AND circuit operatively connected with said inverter and said pulse generation means for obtaining and outputting a logical product of the output data of said inverter and the square wave pulse from said pulse generation means;

a second mono multivibrator operatively connected with said second AND circuit for outputting, every time a high level of the output pulse data of said second AND circuit is supplied thereto, an output pulse data with its duty ratio decreased; and an OR circuit operatively connected with said first and second mono multivibrators and said first switch for obtaining a logical sum of the output pulse data of said first and second mono multivibrators and outputting the logical sum to said first switch.

6. A magneto-optic overwrite disk recording system according to claim 1, wherein said duty ratio control means comprises:

a data conversion circuit for converting a portion of the binary record data for which a mark is to be recorded to high level data and another portion thereof for which a formerly recorded mark is to be erased to low level data;

a first AND circuit operatively connected with said data conversion circuit and said pulse generation means for obtaining and outputting a logical product of an output data from said data conversion circuit and the square wave pulse from said pulse generation means;

a first mono multivibrator operatively connected with said first AND circuit for outputting, every time a high level of the output pulse data of said first AND circuit is supplied thereto, an output pulse data with its duty ratio increased;

a delay circuit operatively connected with said data conversion circuit for delaying the output data from said data conversion circuit by one period of the square wave pulse from said pulse generation means;

a NOR circuit operatively connected with said data conversion circuit and said delay circuit for inverting a logical sum of the output data of said data conversion circuit and an output data of said delay circuit and outputting an inverted data;

a second AND circuit operatively connected with said NOR circuit and said pulse generation means for obtaining and outputting a logical product of the output data of said NOR circuit and the square wave pulse from said pulse generation means;

a second mono multivibrator operatively connected with said second AND circuit for outputting, every time a high level of the output pulse data of said second AND circuit is supplied thereto, an output pulse data with its duty ratio decreased; and an OR circuit operatively connected with said first and second mono multivibrators and said first switch for obtaining a logical sum of the output pulse data of said first and second mono multivibrators and outputting the logical sum to said first switch.

* * * * *